United States Patent [19]

Alseth et al.

[11] 4,350,509

[45] Sep. 21, 1982

[54] DISPOSABLE AIR CLEANER

[75] Inventors: Steven M. Alseth, Bloomington; Bruce M. Sullivan, Burnsville, both of Minn.

[73] Assignee: Donaldson Company, Inc., Minneapolis, Minn.

[21] Appl. No.: 286,475

[22] Filed: Jul. 24, 1981

[51] Int. Cl.$^3$ ............... B01D 46/02; B01D 46/52; B01D 50/00

[52] U.S. Cl. ............... 55/337; 55/419; 55/429; 55/482; 55/492; 55/498; 55/502; 55/505; 55/510

[58] Field of Search ............ 55/337, 419, 429, 492, 55/498, 499, 502, 505, 507, 509, 510, 482

[56] References Cited

U.S. PATENT DOCUMENTS

| | | | |
|---|---|---|---|
| 1,898,027 | 2/1933 | Winslow | 55/510 X |
| 2,463,722 | 3/1949 | Spraragen | 55/510 X |
| 2,959,248 | 11/1960 | Thornburgh | 55/498 X |
| 2,962,121 | 11/1960 | Wilber | 55/498 X |
| 2,966,960 | 1/1961 | Rochlin | 55/502 |
| 3,078,650 | 2/1963 | Anderson et al. | |
| 3,123,456 | 3/1964 | Boltz et al. | 55/492 |
| 3,147,100 | 9/1964 | Wilber | 55/510 X |
| 3,399,515 | 9/1968 | Hahl | 55/429 X |
| 3,429,108 | 2/1969 | Larson | |
| 3,508,383 | 4/1970 | Humbert, Jr. et al. | 55/337 |
| 3,616,618 | 11/1971 | Gronholz et al. | |
| 3,672,130 | 6/1972 | Sullivan et al. | |
| 3,918,942 | 11/1975 | Rechtsteiner et al. | 55/498 X |

FOREIGN PATENT DOCUMENTS 880812 10/1961 United Kingdom ............ 55/510

OTHER PUBLICATIONS

Air Maze, Incom International Inc., "Small Filters and Filter Silencers", Dated Sep. 1, 1980, Teledyne Wisconsin Motor on Model TJD.

Primary Examiner—Kathleen J. Prunner
Attorney, Agent, or Firm—Merchant, Gould, Smith, Edell, Welter & Schmidt

[57] ABSTRACT

An air cleaner and an intake tube having an air permeable portion at one end thereof forms an inner support for the air cleaner, but which is detachable therefrom. In one embodiment, the air cleaner is a single integral unit which is disposed of after use. The unit includes a tubular filter element having an opening sized to receive the intake tube, a shell surrounding the filter element, one end cap sealing and forming a junction between the filter element, shell and intake tube at one end, another end cap sealing and forming a junction between the filter element and shell at the other end and having an aperture through which the intake tube is inserted and at least one air intake aperture in one of the caps. In another embodiment, a centrifugal separator and a dust collector cap which may be emptied from time to time to extend the life of the air cleaner is incorporated therein. The intake tube may also have a right angle bend for side mounted filters.

10 Claims, 6 Drawing Figures

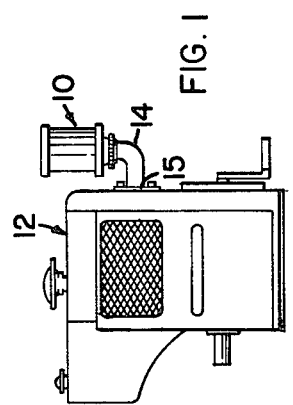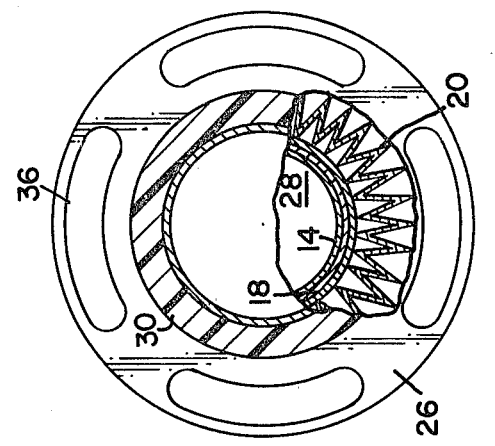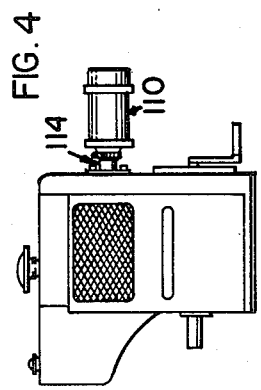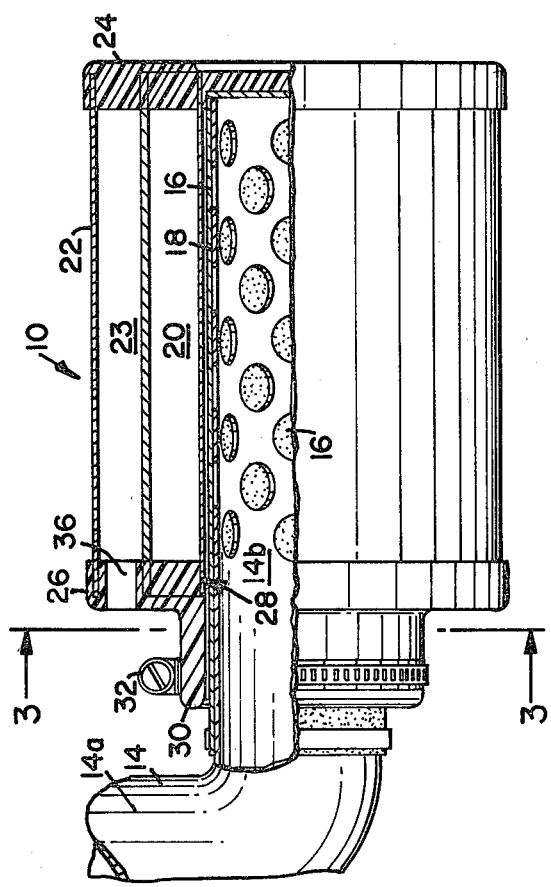

DISPOSABLE AIR CLEANER

TECHNICAL FIELD OF THE INVENTION

The invention is directed generally to the field of air cleaners, and specifically cleaners having integral filter elements which are not replaceable.

BACKGROUND OF THE INVENTION

Engine air cleaners, and particularly those intended for small engines, must be manufactured in a multitude of sizes and shapes in order to accommodate the specifications of different engine manufacturers. Many such air cleaners are designed with removable and replaceable filter elements which must also be stocked in a large variety of sizes. In addition, removable element filters may be subject to leakage as they contain seals which are subject to misalignment and wear.

To eliminate air leakage and provide a single, inexpensive disposable air cleaner for use on a wide variety of machines, the air cleaner must be made of inexpensive disposable materials and be adaptable for attachment to machines having a wide variety of mounting arrangements. Typically, however, cleaners made of lightweight, inexpensive material such as simple plastics and paper are not strong enough to sustain high internal pressures encountered in use. It is necessary to provide a filter means of high strength to maintain the cleaner integrity, however, the materials appropriate for this function do not generally conform to the requirements for cost, weight and disposability.

In the present invention, we have solved the above problems by creating a disposable air cleaner, preferably made up of lightweight, inexpensive, disposable materials while creating a reusable adapter means which is permanently mounted on the machine, with the adapter means supplying the structural support necessary for the lighter weight disposable air cleaner. Simultaneously, we have reduced the likelihood of leakage in the air cleaner by eliminating all seals except a single seal required to attach the filter to the adapter assembly.

SUMMARY OF THE INVENTION

The present invention is directed to an air cleaner produced with a tubular fluid permeable intake tube comprising, a tubular filter element having first and second ends and an inner aperture sized to receive the intake tube, an outer cylindrical shell having first and second ends, the shell located concentrically around the filter element and defining a space between the shell and the element, a first end cap affixed to and forming a fluid-tight junction with each of the first ends, a second end cap affixed to and forming a fluid-tight junction with each of the second ends, the second cap having an aperture aligned with the inner aperture and sized to receive the intake tube, at least one intake aperture in at least one of the ends located to put the defined space in fluid communication with the outside air, a tubular flange extending from the second cap at the periphery of the inner aperture and means for compressing the flange around the intake tubes so that a fluid-tight seal is created therebetween.

According to a further aspect of the invention, there is included a plurality of radially, outward air deflecting projecting blades located within the defined space to create a whirling motion and centrifugally separate particulate matter. Also included is a removable dust cap which collects this separated particular matter. By removing the dust cap, this matter can be discharged.

Thus, there have been outlined rather broadly the more important features of the invention in order that the detailed description thereof as follows may be better understood and in order that the present contribution to the art may be better appreciated. There are, of course, additional features of the invention that will be detailed hereinafter and will form the subject of the claims appended hereto. Those skilled in the art will appreciate that the conception upon which the disclosure is based may readily be utilized as the basis for the designing of other structures. It is important, therefore, that the claims be regarded as including such equivalent structures as do not depart from the spirit and scope of the invention.

BRIEF DESCRIPTION OF THE DRAWINGS

The specific embodiments of the invention have been chosen for the purposes of illustration and description, and are shown in the accompanying drawings forming a part of the specification wherein:

FIG. 1 is a side elevation of the present invention affixed to a small engine;

FIG. 2 is a side elevation with portions broken away of the air cleaner in FIG. 1 and different orientation;

FIG. 3 is a cross sectional view taken along line 3—3 of FIG. 2;

FIG. 4 is an alternate preferred embodiment of the present invention shown on an engine;

DESCRIPTION OF THE PREFERRED EMBODIMENT

Figure 6:
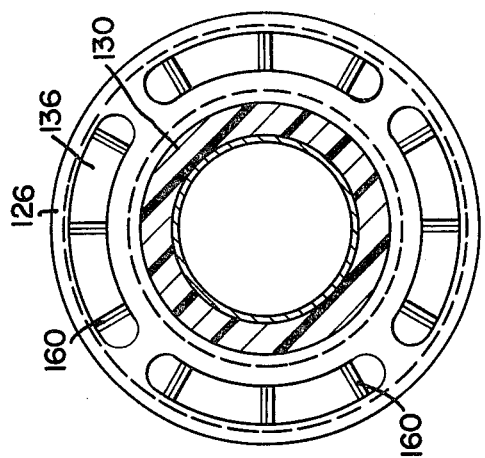
FIG. 6 is a cross sectional view taken along line 6—6 of FIG. 5.

FIG. 1 discloses generally a preferred embodiment of the air cleaner 10 of the present invention affixed to a small engine 12 by means of a tubular air permeable intake tube and mounting means 14.

This embodiment is shown in greater detail of FIG. 2 of the drawings. In FIG. 2 there can be seen tube 14 having a solid portion 14a and an air permeable portion 14b extending into the air cleaner 10. Portion 14b in the preferred embodiment is made fluid permeable by a plurality of holes 16. In the preferred embodiment, although optional, surrounding portion 14b is a fluid permeable sheath or sock-like element 18 which acts as a safety element. As an alternative, a screen or mesh material 19, shown in FIG. 5, made of plastic, may be employed.

Coaxially aligned with portion 14b and sheath 18 is a filter element 20 shown more clearly in FIG. 3 as a pleated element preferably made of a flexible, non-woven material which typically is of insufficient strength to be self supporting under the pressure encountered during filtration. A cylindrical shell 22 is similarly coaxially aligned with tubular portion 14b and filter 20.

Acting as an air seal and a structural end member, is end member 24 which forms an airtight junction with cylindrical shell 22, filter 20, sheath 18 and intake tube 14 at one end. Although the end members may be formed of any suitable lightweight material, a molded urethane material of 90 shore A durometer, which is fairly rigid but flexible enough to maintain adequate seals is preferred.

Outer cylindrical wall 22 may be paper impregnated with phenolic resin, or alternatively, plastic or steel, if desired.

The remaining end member 26 is formed in similar fashion to that of member 24 and creates an airtight seal between the cylindrical wall 22, and filter element 20. To permit intake 14 to be inserted within the air cleaner, member 26 includes an aperture 28.

Extending outwardly from member 26 generally at aperture 28, is flange member 30 which is preferably molded in a single piece with member 26. To maintain an airtight seal between the air cleaner and intake 14, compression or securing means are employed against the flexible material used in flange 30. In the preferred embodiment, a worm drive band clamp 32 is employed.

To provide a source of intake air for the air cleaner 10, at least one aperture is formed in one of the end members. Preferably, four curved slots 36 are formed in member 26 shown in FIG. 3 where slots 36 are located so as to allow air to enter within the space 23 defined between cylindrical wall 22, filter 20 and end member 24. Slot 36 may alternatively be located in member 24 so long as the filter is not oriented such that dirt will have a tendency to fall into the filter by gravitational force.

OPERATION

In use, intake tube 14 having a flange 15 may be affixed to a machine 12, the flange being designed according to the specific requirments of the machine. Once the proper intake tube has been installed, and it is expected that a number of different sizes will be available, a single size air cleaner 10 may be used for many applications. Because air cleaner 10 is intended to be fully disposable, it is preferably made of inexpensive, lightweight materials. To prevent interior collapse of the filter, the air permeable portion 14b of intake tube 14, which is received within aperture 28, is intended to provide the interior mechanical support. The intake tube is, of course, reusable so that the heavier, more expensive parts of the system are retained.

ALTERNATIVE TO THE PREFERRED EMBODIMENT

Figure 5:
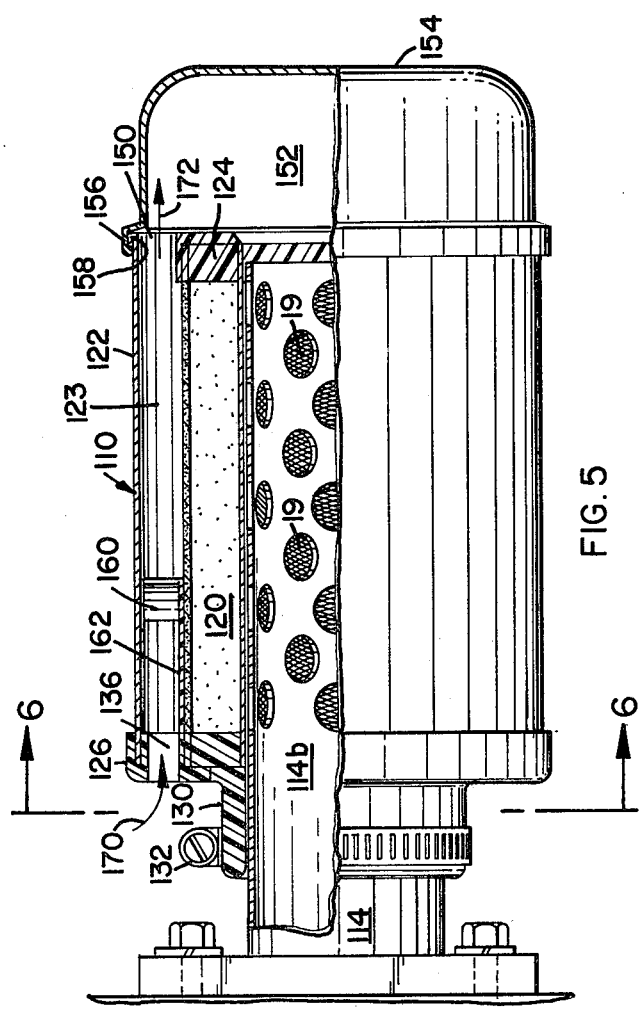
FIG. 5 is a side elevation of the air cleaner shown in FIG. 4 with portions broken away.

FIGS. 4, 5 and 6 show an alternative preferred embodiment of the present invention.

To the extent the air cleaner 110 in FIG. 4 includes the same elements as air cleaner 10 in FIG. 1, such like elements will be designated with the same numeral increased by the number 100 and will only differ from their counterpart to the extent mention is made thereof.

In FIG. 4, there can be seen that intake tube 114, which corresponds to tube 14, is straight rather than having a right angle then which is suitable for particular applications.

Turning to FIG. 5, a screen 19 is used in place of sheath 18, although the alternative is acceptable. End member 124 differs from end member 24 in that a passage 150 is formed to allow a passageway between space 123 and space 152, which is defined between end member 124 and a removable end cap dust collector 154. Filter 110 is intended to be oriented so that passageway 150 tends to be toward the top side of the filter for purposes as will be explained hereinafter.

Cap 154 is preferably made of a relatively hard plastic material having a snap fit by means of a hook member 156 which engages a lip 158 formed in cylindrical wall 122 at that end. The hook and lip means are formed around the circumference of both the cylindrical member 122 and cap 154. The slight flexibility in cap 154 permits the user to disengage the hook and lip at some point around the circumference and remove the cap entirely from the air cleaner.

Interposed within space 123 preferably toward end 126 are a series of radially outwardly air deflecting projecting blades contacting cylindrical wall 122 and affixed to cylindrical support member 162. Blades 160 are of the type described in U.S. Pat. No. 3,078,650, issued to Anderson et al, which is hereby incorporated by reference.

OPERATION

Except for the following, this embodiment operates in a manner similar to that of the first preferred embodiment explained above. The addition of blades 160 permit centrifugal separation of heavier particulate matter from the intake air so as to prevent their entrainment on the filter medium. The air entering intake passage 136 as shown by arrow 170 enters space 123. The air will pass through blades 160 causing the heavier particles to be centrifugally separated and carried in the direction of arrow 172 into dust collector cap 154, where they are deposited. Passage 150 must be oriented toward the top side of the filter so that particulate matter will be trapped within dust collector cap 154.

While we have shown certain preferred embodiments, it will be understood that the same is capable of modification without departure from the scope and spirit of the invention as defined in the claims.

What is claimed is:

1. An air cleaner for use with a tubular, fluid permeable, rigid intake tube having an air permeable portion, said air cleaner comprising:
   a. a tubular filter element having first and second ends, and an inner opening therein adapted to receive said air permeable portion of said intake tube;
   b. an outer cylindrical shell having first and second ends, said shell being located concentrically around said filter element and defining a space between said shell and said element;
   c. a first end cap affixed to and forming a fluid tight junction with each of said first ends of said filter element and said shell;
   d. a second end cap affixed to and forming a fluid tight junction with each of said second ends, said second cap having an aperture aligned with said inner opening and adapted to receive said intake tube;
   e. at least one intake aperture in at least one of said end caps located to place said defined space in fluid communication with air outside the air cleaner;
   f. a tubular flange extending from said second end cap at the periphery of said second end cap apaerture; and
   g. compression means for compressing said flange to reduce the diameter of said flange.

2. An air cleaner according to claim 1 wherein said at least one intake aperture is located in said second end cap.

3. An air cleaner according to claim 1 wherein said at least one intake aperture includes a plurality of apertures equally spaced around the center of said end cap.

4. An air cleaner according to claim 1 including a plurality of radially outwardly projecting air deflecting blades located within said defined space generally toward said second end cap, said second end cap having said intake aperture, said blades being oriented to deflect unfiltered intake air causing centrifugal particle separation by preventing heavier particulate matter from reaching said filter element;

a dust collector cap removably affixed to said air cleaner on said first end of said shell; and said first end cap including a passage between said defined space and said dust cap so that centrifugally separated particles may be collected in said dust cap.

5. An air cleaner assembly for attachment to a machine requiring filtered air comprising:
  (a) an air intake tube, constructed of relatively rigid material, adapted to be mounted on the machine, said tube having a portion with perforations therein;
  (b) an air cleaner, comprising:
    (i) a tubular filter element having first and second ends, and a central opening therein extending between said ends sized to receive said portion of said intake tube;
    (ii) an outer cylindrical shell having first and second ends, said shell located concentrically around said filter element and defining a space between said shell and said element;
    (iii) a first end cap affixed to and forming a fluid tight junction with each of said first ends of said filter element and said shell;
    (iv) a second end cap affixed to and forming a fluid tight junction with said second ends, said second end cap having an aperture aligned with said central opening and sized to receive said intake tube;
    (v) at least one air intake aperture in at least one of said end caps;
    (vi) a tubular flange of compressible material extending from said second end cap at the periphery of said second end cap aperture; and
  c. means for mounting said air cleaner on said intake tube with said intake tube extending within said air cleaner substantially the entire length thereof, comprising compression means for compressing said flange against said intake tube so that a fluid tight seal is formed therebetween;
whereby said intake tube provides internal structual support for said filter element.

6. An air cleaner assembly according to claim 5 including a safety element comprising an air permeable porous sheath extending over said intake tube between said tube and said filter element.

7. An air cleaner assembly according to claim 5 wherein said intake tube includes a mounting flange affixed thereto for attaching said tube to an intake port on a machine.

8. An air cleaner assembly according to claim 7 wherein said intake tube includes a right angle bend so that said filter element may be positioned vertically and wherein said mounting flange is affixed to said tube at its end distant from said element.

9. An air cleaner assembly comprising:
  (a) a rigid air intake tube having a first open end, a second open end adapted to be attached to a machine requiring filtered air;
  a first air permeable portion adjacent said first end, and a second nonpermeable portion adjacent said second end;
  (b) an air cleaner comprising:
    (i) a pleated cylindrical filter element constructed of flexible, nonwoven material having first and second ends and an axial cylindrical opening therethrough sized to removably receive said first portion of said intake tube;
    (ii) first means for creating an air impervious barrier orthogonal to said filter element at said first end thereof, so that the air cleaner is sealed at one end;
    (iii) second means for creating an air impervious barrier orthogonal to said filter element at said second end thereof, said second barrier including an aperture aligned with said opening in said filter element to allow for passage of said air intake tube therethrough;
    (iv) a cylindrical flange constructed of a compressible material extending from said second barrier at said aperture for providing a surface to seal said second barrier with respect to said intake tube; and
  (c) means located on said flange for releasably compressing said flange against said intake tube with said first end of said intake tube being disposed adjacent said first end of said filter element so that said air permeable portion thereof is positioned adjacent to and provides structural support for said filter element.

10. An air cleaner according to claim 9 wherein a sock-like safety element is mounted over said first end of said tube between said tube and said filter element.

* * * * *